United States Patent [19]

Hayasaki

[11] Patent Number: 5,499,953
[45] Date of Patent: Mar. 19, 1996

[54] CONTROL DEVICE HAVING COMPENSATION MEANS FOR CHANGING PREDETERMINED THROTTLE PEDALLING SPEEDS OF AUTOMATIC TRANSMISSION FOR VEHICLE

[75] Inventor: Koichi Hayasaki, Ebina, Japan

[73] Assignee: Nissan Motor Co., Ltd., Yokohama, Japan

[21] Appl. No.: 238,942

[22] Filed: May 6, 1994

[30] Foreign Application Priority Data

Jun. 28, 1993 [JP] Japan ............................. 5-156964

[51] Int. Cl.$^6$ ............................. G06F 15/50; F16H 59/18
[52] U.S. Cl. ............................................. 477/120; 477/905
[58] Field of Search ........................... 477/120, 121, 477/904, 905

[56] References Cited

U.S. PATENT DOCUMENTS 4,589,302   5/1986   Oda et al. ........................ 477/905 X
4,996,893   3/1991   Nakamura et al. ................ 477/120
5,341,295   8/1994   Nakagawa et al. ............... 477/120 X

FOREIGN PATENT DOCUMENTS

282387   9/1988   European Pat. Off. ............... 477/905
438643   7/1991   European Pat. Off. ............... 477/905
3-129161 6/1991   Japan .

Primary Examiner—Khoi Q. Ta
Attorney, Agent, or Firm—Foley & Lardner

[57] ABSTRACT

A control device of an automatic transmission capable of controlling the operation so as to suit the gearshift operation to a driver's pedalling operation for acceleration and deceleration. The control device selects a gearshift pattern corresponding to a result obtained by comparing a displacement per unit time of an accelerator pedal with a predetermined displacement per unit time of the accelerator pedal. Further, the device includes a microcomputer to monitor the driver's pedalling operation for acceleration and deceleration when the gearshift is carried out and to compensate the predetermined displacement per unit time of the accelerator pedal in such a manner that the driver's unnatural pedalling operation would not be required.

14 Claims, 5 Drawing Sheets

CONTROL DEVICE HAVING COMPENSATION MEANS FOR CHANGING PREDETERMINED THROTTLE PEDALLING SPEEDS OF AUTOMATIC TRANSMISSION FOR VEHICLE

BACKGROUND OF THE INVENTION

This invention relates to a control device of an automatic transmission for a vehicle. More particularly, it relates to a device for controlling the automatic transmission so as to suit its gearshift operation to a driver's pedalling operation for acceleration and deceleration.

Such a device for controlling the operation of the automatic transmission can be found in Japanese Unexamined Patent Publication No.3-129161. In the publication, when an accelerator pedal is pressed at a high speed, the device operates to shift a downshift change line to a direction of high speed of vehicle. Consequently, the tendency that a gearshift in the automatic transmission is changed to the down side is so increased that the actual downshift change can be matched with the driver's pedalling to the accelerator pedal.

However, in the conventional device as mentioned above, since the tendency of the downshift change is increased in constant ratio, the drivers' estimation of whether the increased tendency is appropriate or not, are different dependent to the drivers. That is, the increased tendency for downshift change is not always acceptable for all type of drivers.

In detail, there are all sorts of drivers including some drivers who like a gentle drive and the other drivers who like an active drive. Although the tendency of the downshift change in the automatic transmission is changed in proportion to the pedalling speed of the driver in the prior art device, the gentle driver may feel that the transmission is subject to change for downshift and the active driver may feel that the transmission is not subject to change for downshift, so far as the relationship between the tendency of the downshift change and the pedalling speed is fixed. In other words, in the prior art device, the gearshift in the automatic transmission cannot be carried out so as to be convenient for all type of drivers.

In addition, even if the same kind of automatic transmissions are installed with vehicles, each potential of acceleration differs with the vehicles equipped with engines of different power, weight and so on. For example, in the vehicle having a low potential of acceleration, since the accelerator pedal of the vehicle is apt to be pressed at a relatively high speed, the tendency of the downshift change would be increased uniformly so that the driver may feel that it is disagreeable.

SUMMARY OF THE INVENTION

It is an object of the present invention to provide a device for controlling transmission of an automatic transmission, which is so constructed that the easiness of the transmission can be varied so as to suit the driver's taste in driving and the specifications of the vehicle.

The objects of the invention described above can be accomplished by a device for controlling an automatic transmission for vehicle, which selects a gearshift pattern corresponding to a result obtained by comparing an actual pedalling speed of an accelerator pedal with a predetermined pedalling speed to thereby carry out a transmission control on the basis of said gearshift pattern selected, comprising, in combination:

monitoring means for monitoring a driver's pedalling operation for acceleration and deceleration during and after a gearshift in said automatic transmission is carried out; and compensating means for compensating said predetermined pedalling speed in such a manner that said driver's unnatural pedalling operation monitored by said monitoring means can be dissolved.

In the present invention, preferably, the compensating means compensate the predetermined pedalling speed when a downshift change is carried out in the automatic transmission by the driver's pressing on the accelerator pedal.

In the present invention, the gearshift pattern may be a selected from one of a plurality of gearshift patterns which have different downshift change lines along which a speed position of said automatic transmission is changed to a lower speed position, respectively. Alternatively, the gearshift pattern may be a selected from one of a plurality of gearshift patterns each of which has downshift and upshift change lines different from each other In the present invention, preferably, the monitoring means detect the driver's pedalling for deceleration in a period between a time when a command for gearshift is produced and a time when a change of engine speed of the vehicle is finished and then the compensating means compensate the predetermined pedalling speed by a predetermined value X so as to decrease a possibility of a gearshift to a down side in the automatic transmission.

Furthermore, in the present invention, the monitoring means detect the driver's pedalling for deceleration at a speed more than the predetermined pedalling speed in a predetermined period from a time when a change of engine speed of the vehicle is finished or the driver's pedalling for deceleration prior to a predetermined time and then the compensating means compensate the predetermined pedalling speed by a predetermined value Y so as to decrease a possibility of a gearshift to a down side in the automatic transmission.

In the present invention, preferably, the monitoring means detect the driver's pedalling for deceleration at a speed less than the predetermined pedalling speed in the predetermined period from the time when the change of engine speed of the vehicle is finished or the driver's pedalling for deceleration in excess of the predetermined time and then the compensating means compensate the predetermined pedalling speed by a predetermined value Z so as to decrease the possibility of the gearshift to the down side in the automatic transmission.

Preferably, the relationship between the predetermined values X, Y and Z is that X is more than Y and that Y is more than Z.

In a modification of the present device, the monitoring means detect the driver's pedalling for acceleration at a speed more than the predetermined pedalling speed in a predetermined first period from a time when a change of engine speed of the vehicle is finished or the driver's pedalling for acceleration prior to a predetermined time and wherein the monitoring means detect the driver's pedalling for acceleration maintained in a period more than a predetermined second period and then the compensating means compensate the predetermined pedalling speed by a predetermined value α so as to increase a possibility of a gearshift to a down side in the automatic transmission.

In a further modification of the present device, the monitoring means detect the driver's pedalling for acceleration at a speed more than the predetermined pedalling speed in a predetermined first period from a time when a change of engine speed of the vehicle is finished or the driver's pedalling for acceleration prior to a predetermined time and wherein the monitoring means detect the driver's pedalling for acceleration cancelled within a predetermined second period and then the compensating means compensate the predetermined pedalling speed by a predetermined value β so as to increase a possibility of a gearshift to a down side in the automatic transmission.

In a modification of the present device, the monitoring means detect the driver's pedalling for acceleration at a speed less than the predetermined pedalling speed in a predetermined period from a time when a change of engine speed of the vehicle is finished or the driver's pedalling for acceleration in excess of a predetermined time and then the compensating means compensate the predetermined pedalling speed by a predetermined value γ so as to increase a possibility of a gearshift to a down side in the automatic transmission.

Preferably, the relationship between the predetermined values α, β and γ is that α is more than β and that β is more than γ.

DESCRIPTION OF THE PREFERRED EMBODIMENT

Figure 1:
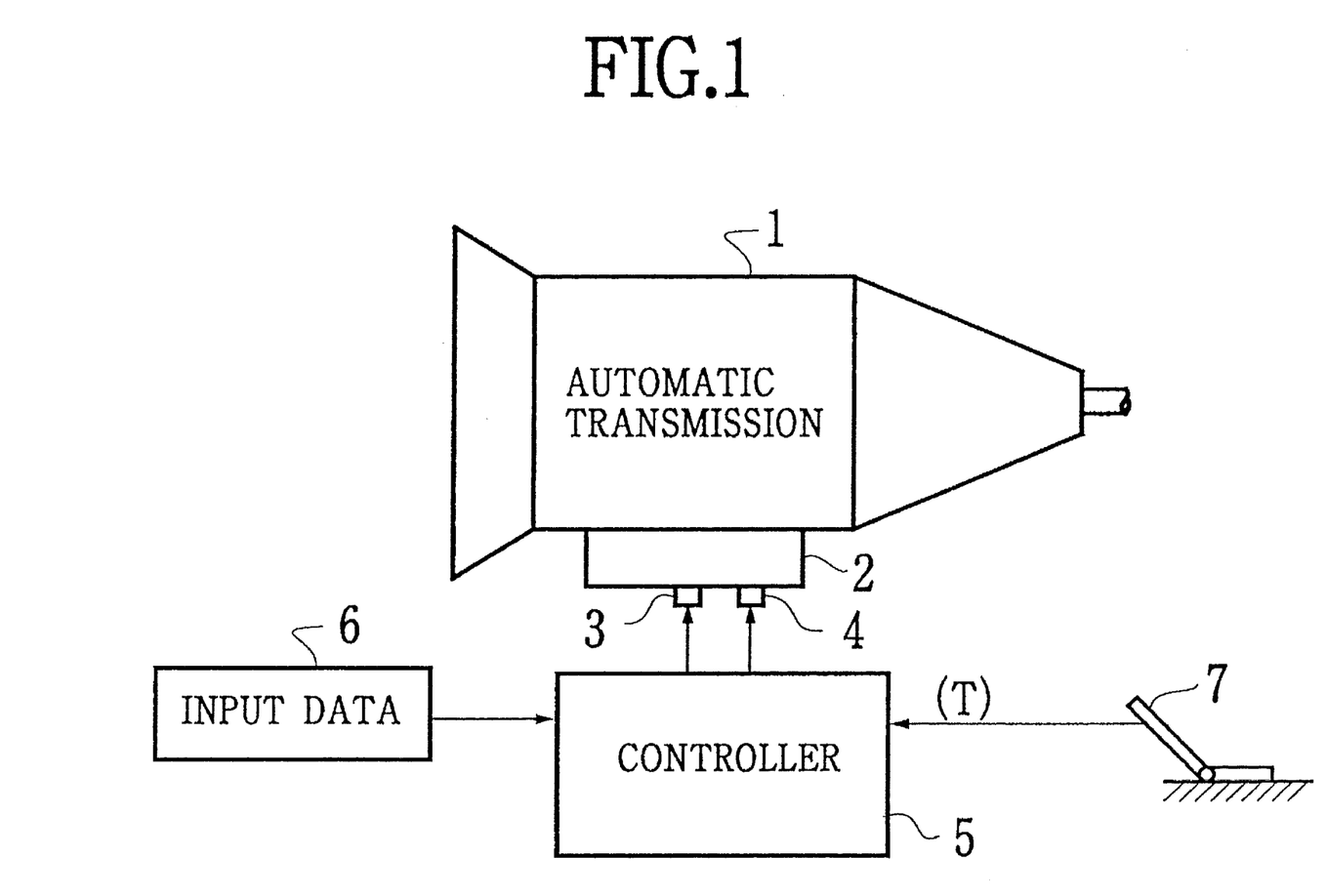
FIG. 1 is a block diagram showing a control system of an automatic transmission equipped with a device for controlling the transmission according to an embodiment of the present invention.

FIG. 1 shows a control system of an automatic transmission equipped with a control device according to an embodiment of the present invention.

Referring to FIG. 1, reference numeral 1 designates an automatic transmission for which the transmission control of the invention is applied, and reference numeral 2 designates a control valve in which a hydraulic circuit for the transmission control is installed. The control valve 2 includes shifting solenoids 3 and 4. In combination with their ON and OFF states therebetween, the shift solenoids 3 and 4 can bring gears (not shown) of the automatic transmission 1 to any one of speed positions from a first speed position to a fourth speed position. The ON/OFF states of the shifting solenoids 3 and 4 are controlled by a control device S which will be referred to "the controller" hereinafter.

The controller 5, which is constructed by a microcomputer, inputs several kinds of driving data and a pedalling amount T of an accelerator pedal 7, in order to carry out the transmission control of the automatic transmission 1 by controlling the ON/OFF states in the shift solenoids 3 and 4. When the above-mentioned transmission control is carried out, the controller 5 executes the processes in the programs shown in FIGS. 2 and 3, which are driven at predetermined intervals, respectively.

Figure 2:
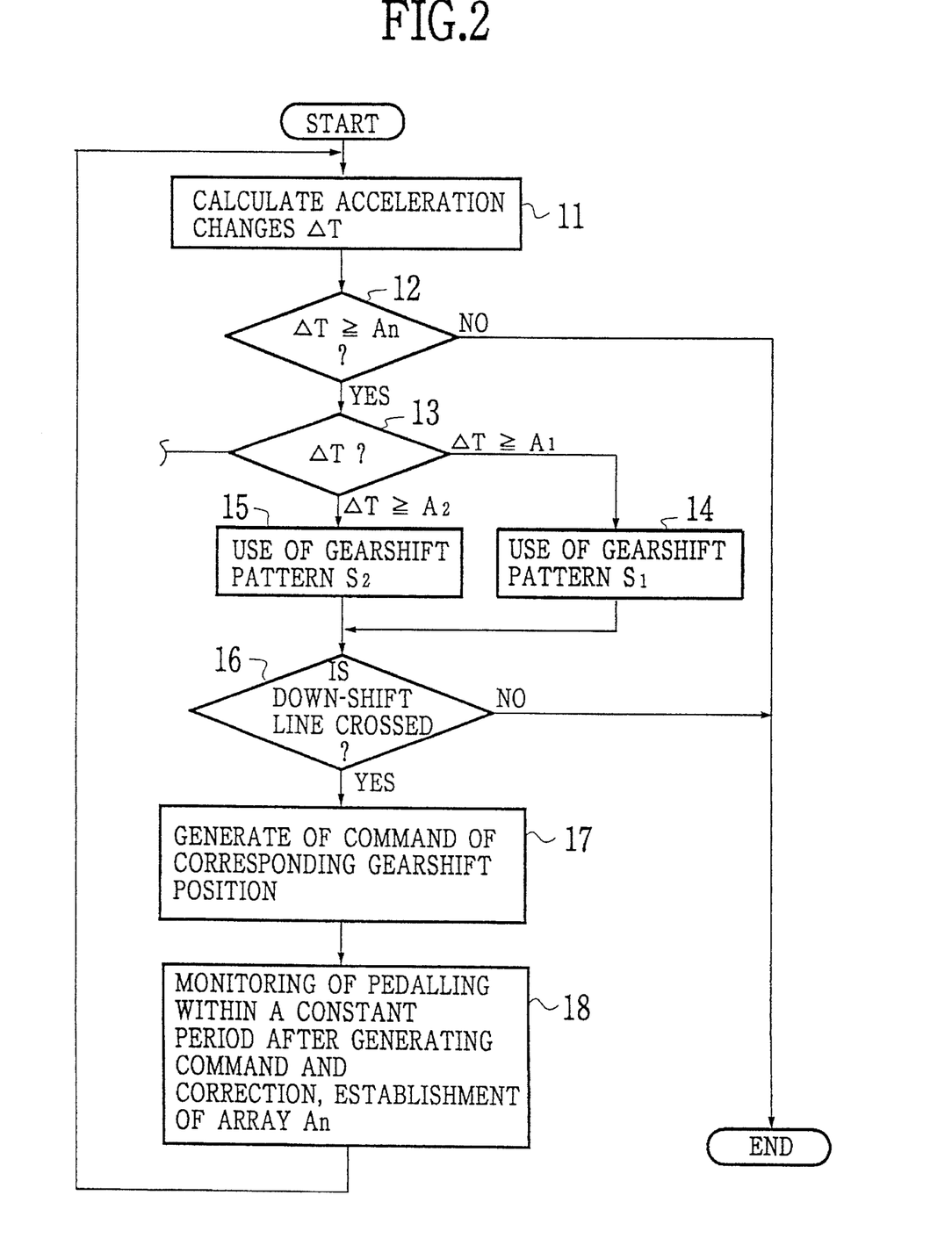
FIG. 2 is a flow chart showing a transmission control program which is executed by the device according to the embodiment shown in FIG. 1.

Referring to FIG. 2, first of all, a difference between the pedalling amount T at present and the previous pedalling amount T, which is referred to a pedalling change $\Delta T$ hereinafter, is calculated at step 11. Note that, in this embodiment, the change $\Delta T$ is substantially identical to a pedalling speed at which the accelerator pedal 7 is manipulated because the execution interval of the routine of FIG. 2 is constant.

Then, at step 12, it is judged whether the calculated change $\Delta T$ is more than any one of predetermined values An (n=1, 2, 3 . . . ). If the Judgement at step 11 is NO, that is, none of the values An are less than the change $\Delta T$, then the routine is ended since there is no need of the downshifting change in the automatic transmission.

On the contrary, when the judgement is Yes, the routine goes to step 13 where it is checked which value of $A_1$, $A_2$, $A_3$ . . . , the change $\Delta T$ exceeds. Then, at sequent steps 14, 15 and so on ( partially shown in the figure), any one of the gearshift patterns of $S_1$, $S_2$, $S_3$ . . . which have been established corresponding to the values $A_1$, $A_1$, $A_3$ . . . respectively, is selected corresponding to the checking result at step 13.

Note that, although each of the gearshift patterns $S_1$, $S_2$, $S_3$ . . . of the embodiment is established so as to have a different downshift change line of the automatic transmission from each other, each of the patterns may downshift and upshift change lines different from each other.

Next, at step 16, it is judged whether there is caused a driver's pedalling to cross the downshift change line of the selected gearshift pattern. If the judgement is No, the routine goes to END-because there is no need of the gearshift in the automatic transmission.

On the contrary, if such a pedalling is caused by the driver, the routine goes to step 17 where a downshift command is generated to change a speed position of the transmission at present to a corresponding speed position.

At sequent step 18, monitoring the pedalling operation within a predetermined period after generating the command, the values An are compensated to a new array of values An in accordance With the result monitored. Then, the routine is returned to step 11 and the above-mentioned processes are periodically executed.

In this way, according to the afore-mentioned routine processes, any one of the gearshift patterns of $S_1$, $S_2$, $S_3$ . . . is properly selected corresponding to the result of comparing the change $\Delta T$ with the values of $A_1$, $A_2$, $A_3$ . . . , and then the automatic transmission is controlled as a basis of the selected gearshift pattern. In addition, at step 18, the Values of $A_1$, $A_2$, $A_3$ . . . are corrected corresponding to the pedalling maniplation during and after the gearshift is carried out.

Figure 3:
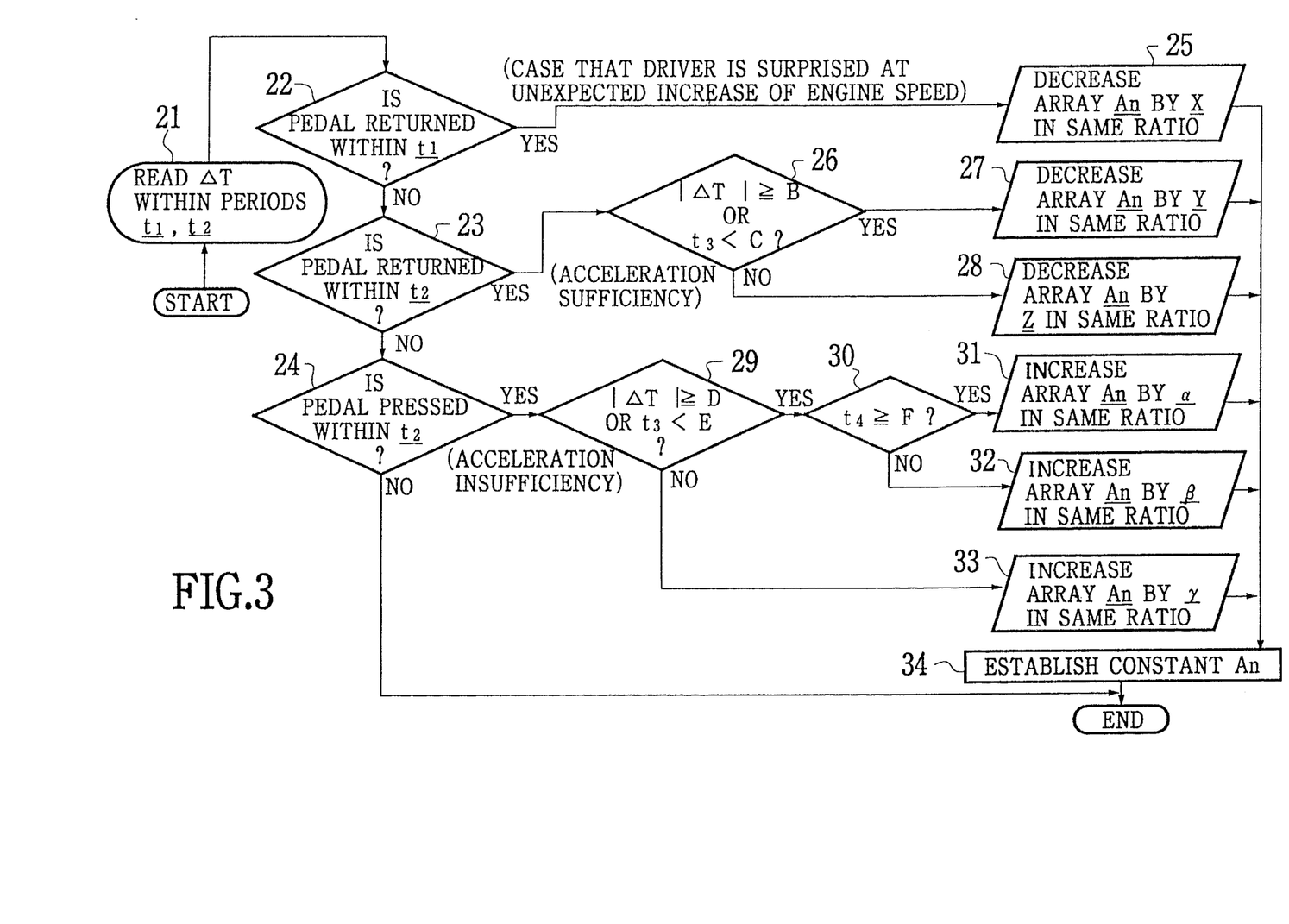
FIG. 3 is a flow chart showing a program for compensating a predetermined speed at which an accelerator pedal is pressed and which provides a selected transmission pattern in the transmission control.
Figure 4:
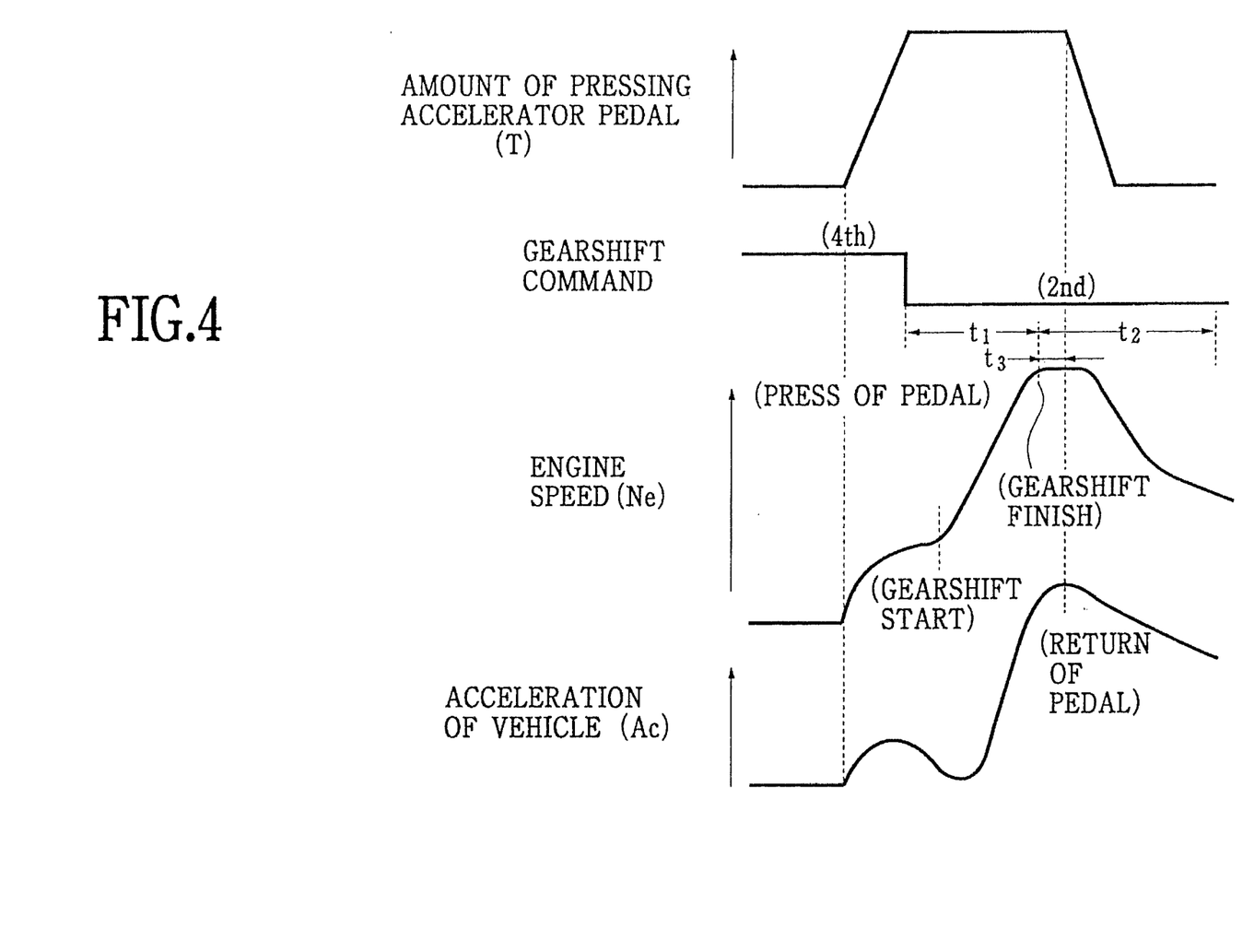
FIG. 4 is a timing chart in case that the driver operates to return the accelerator pedal unnaturally after a gearshift of the automatic transmission.
Figure 5:
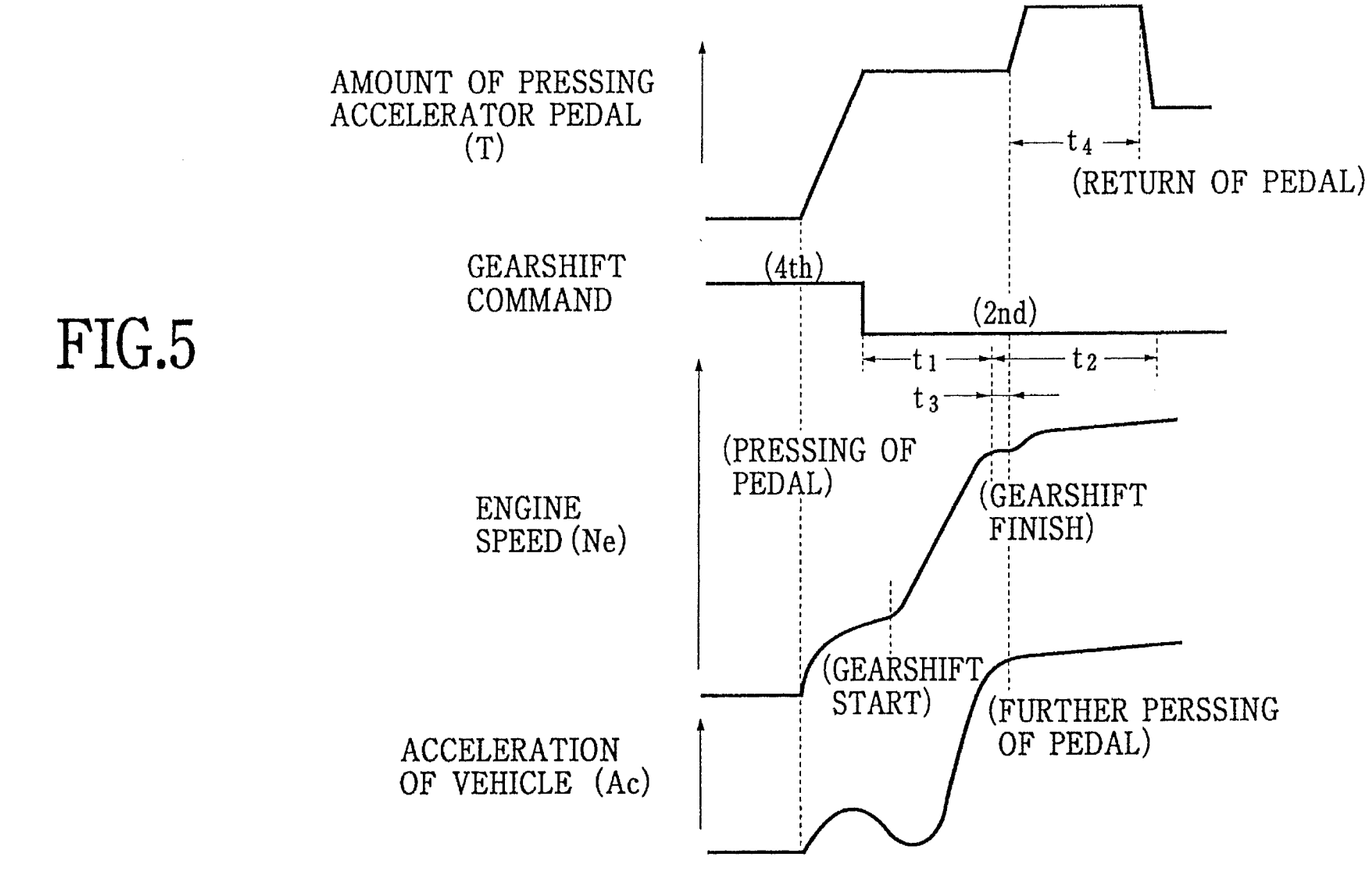
FIG. 5 is a timing chart in case that the driver operates to further press on the accelerator pedal unnaturally after the gearshift of the automatic transmission.

The detailed processes executed at step 18 will be described below. FIG. 3 shows the processes explaining how the array of An is compensated and the new array is established. As a reference, FIG. 4 shows a timing chart of driving characteristics in case that, after the gearshift is carried out from 4th speed position to 2nd position by the driver's pedalling, he is surprised at unexpected increases of an engine speed Ne and an acceleration Ac, and then he returns the accelerator pedal 7 to an initial position. FIG. 5 shows another timing chart in case that a desired acceleration cannot be obtained in spite of the downshift from 4th speed position to 2nd position. Then, he further pressed on the pedal and then returned.

In FIG. 3, at step 21, the two changes ΔT are read in periods shown with $t_1$ and $t_2$ in FIGS. 4 and 5. In the figures, the period $t_1$ corresponds to a period between a time of generating the command for downshift and a time when the gearshift is finished. The period $t_2$ corresponds to a predetermined period after the gearshift is finished.

At sequent step 22, it is judged whether the accelerator pedal 7 is returned by the driver within the period $t_1$ or not. Similarly, at step 23, it is also judged whether the pedal 7 is returned within the period $t_2$ or not. And at step 24, it is judged whether the pedal 7 is pressed again within the period $t_2$ or not.

In case that the judgement at step 22 is Yes, it can be presumed that the driver was surprised at an unexpected increase of the engine speed Ne and thus returns the pedal 7, which is in included in the unnatural pedalling operation. In such a case, the routine goes to step 25 in which each value of the array An is decreased in the same ratio of X and then a corrected array An is newly established at step 34. The new array An is provided in the process executed at step 12 of FIG. 2. In this way, since the values of the array An are decreased proportionally by X, respectively, it is possible to decrease the tendency of the downshift change thereafter. Consequently, such a driver's unnatural pedalling for deceleration can be excluded to thereby obtain the gearshift operation suitable to driver's character.

At step 23, if the judgement is Yes, it can be also presumed that the driver was surprised at an unexpected increase of acceleration with the downshift change and thus returned the accelerator pedal 7 with the period $t_2$, which corresponds to the pedalling operation shown in FIG. 4. In such a case, the routine goes to step 26 where, in order to check a degree of the driver's surprise, it is judged whether an amount of returning of the pedal |ΔT| is excess of a predetermined value B. Alternately, it may be whether a period $t_3$ from the time to finish the gearshift till the time to return the pedal 7, is less than a predetermined time C. If the judgement at step 26 is Yes, the routine goes to step 27 where a process to decrease each value of the array An in the same ratio of Y is executed. Note that, since the degree of the surprise in this case is relatively small in comparison with the former case, the correction ratio Y is established so as to be less than the ratio X in the embodiment. Then, the routine goes to step 34 where a corrected array An is renewed and established. Also in the corrected array An, since the values thereof are decreased proportionally by Y, respectively, it is possible to decrease the tendency of the downshift change thereafter. Consequently, such a driver's unnatural pedalling for deceleration can be excluded to thereby obtain the gearshift operation suitable to driver's character.

On the contrary, if the judgement at step 26 is No, the routine goes to step 28 where a process to decrease each value of the array An in the same ratio of Z is executed since the degree of the surprise is relatively small in comparison with the former two cases. Then, the routine goes to step 34 where a corrected array An is renewed and established. A $_1$ so in this case, since the values of the corrected array An are decreased proportionally by Z, respectively, it is possible to decrease the tendency of the downshift change, whereby the tendency of the driver's unnatural pedalling for deceleration can be diminished to obtain the gearshift suitable to driver's character. Note that, the value of the correction ratio Z is established so as to be less than the ratio Y.

On the other hand, when the judgement at step 24 is Yes, in other words, when the pedal 7 is pressed again within the period $t_2$, it can be supposed that the driver felt an insufficiency of acceleration of the vehicle in spite of the downshift change and thus further presses the accelerator pedal 7 on condition of operating the pedal 7 unnaturally, as shown in FIG. 5. Therefore, in order to presume a degree of the insufficiency of acceleration, the routine goes to step 29 where it is judged whether a gain of the pedal |ΔT| is in excess of a predetermined value D. Alternately, the judgement may be whether the period $t_3$ from the time of finishing to change the speed till the time of further pressing the accelerator pedal, is less than a predetermined time E.

If the judgement at step 29 is Yes, the routine goes to step 30 since the degree of the insufficiency of acceleration is relatively large. At step 30, it is judged whether a period $t_4$ from the time of further pressing the accelerator pedal 7 till the time of returning the accelerator pedal, is more than a predetermined time F in order to check whether the insufficiency of acceleration is extremely large.

When the period $t_4$ is more than the time F, and thus the judgement at step 30 is Yes, the routine goes to step 31 where each value of the array An is increased in the same ratio of α and then a corrected array An is newly established at step 34. Since the values of the array An are increased proportionally by α, respectively, the array An makes it possible to increase the tendency of the downshift change, whereby the tendency of the driver's unnatural pedalling for acceleration can be diminished to obtain the gearshift suitable to driver's character thereafter.

On the contrary, if the judgement at step 30 is No, the routine goes to step 32 where each value of the array An is increased in the same ratio of β (β<α) since it is supposed that the insufficiency of acceleration is relatively small in comparison with that in the former acceleration case. Then, the routine goes to step 34 where a corrected array An is renewed and established. Since the values of the array An are increased proportionally by β, respectively, the array An makes it possible to increase the tendency of the downshift change, whereby the possibility of the unnatural operation of acceleration or deceleration can be diminished to obtain the gearshift suitable to driver's character.

At step 29, if the judgement is No, the routine goes to step 33 where each value of the array An is increased in the same ratio of γ (γ<β) since it is supposed that the insufficiency of acceleration is relatively small. Then, the routine goes to step 34 where a corrected array An is renewed and established. Since the values of the array An are increased proportionally by γ, respectively, the array An makes it possible to increase the tendency of the downshift change, whereby the possibility of the unnatural operation for acceleration can be diminished to obtain the gearshift suitable to driver's character.

As mentioned above, the control program shown in FIG. 3 is to monitor the driver's unnatural pedalling operation during and after the gearshift is carried out and then to correct the array of An, which is used as a standard speed of the accelerator pedal when the above-mentioned transmission pattern is selected, in accordance with the monitoring result, whereby the possibility of the unnatural operations for acceleration or deceleration can be diminished to obtain the gearshift suitable to driver's character.

According to the invention, with the construction mentioned above, it is possible to change the easiness of gearshift so as to be suitable to the driver's character and the specification of the vehicle itself without the driver's unnatural pedalling during and after the gearshift is carried out.

Furthermore, in case that the predetermined pedalling speed is compensated when a downshift change is carried out, the present control device is economical with no futility because the driver's estimation for the automatic transmission is mainly directed to the property in the downshift change.

In addition, in case that the gearshift pattern is a selected one of a plurality of gearshift patterns which have different downshift change lines, a capacity of memory of the microcomputer for controlling the gearshift can be saved. Note that, such effect can be obtained in case that each of the gearshift patterns has a different downshift change line and a different upshift change lines.

According to the invention, since the present device compensates the predetermined pedalling speed by the predetermined values X, Y and Z to decrease the tendency of the downshift change by detecting some pedalling operations for deceleration, an appropriate gearshift operation can be provided to the driver who feels it disagreeable with the increasing of the engine speed caused by the downshift change in the automatic transmission. Similarly, since the device also compensates the predetermined pedalling speed by the predetermined values $\alpha$, $\beta$ and $\gamma$ to increase the tendency of the downshift change by detecting some pedalling operations for acceleration, the appropriate gearshift operation can be provided to the driver who feels that the acceleration is not sufficient in spite of the downshift operation.

What is claimed is:

1. A device for controlling an automatic transmission for a vehicle, said device comprising, in combination:

selecting means for selecting at least one gearshift pattern from a plurality of gearshift patterns corresponding to a result obtained by comparing an actual pedalling speed with at least one of a plurality of predetermined pedalling speeds;

monitoring means for monitoring a driver's pedalling operation for acceleration or deceleration when a gearshift in said automatic transmission is carried out; and compensating means for compensating said predetermined pedalling speeds in response to said monitoring means.

2. A device for controlling operations of an automatic transmission as claimed in claim 1, wherein said compensating means compensates said predetermined pedalling speeds when a downshift change in said automatic transmission is carried out by said driver's pressing on said accelerator pedal.

3. A device for controlling operations of an automatic transmission as claimed in claim 1, wherein said monitoring means detect said driver's pedalling for deceleration in a period between a time to generate a command for said gearshift and a time to finish said gearshift and then said compensating means compensate said predetermined pedalling speeds by a predetermined value X so as to decrease a tendency of a downshift change of said automatic transmission.

4. A device for controlling operations of an automatic transmission as claimed in claim 1, wherein said monitoring means detect at least one of said driver's pedalling for deceleration at a speed more than said predetermined pedalling speed in a predetermined time period from after a finish of said gearshift and said driver's pedalling for deceleration prior to a predetermined time, and wherein then said compensating means compensate said predetermined pedalling speeds by a predetermined value Y so as to decrease a tendency of a downshift of said automatic transmission.

5. A device for controlling operations of an automatic transmission as claimed in claim 1, wherein said monitoring means detect at least one of said driver's pedalling for deceleration at a speed less than said predetermined pedalling speed in said predetermined time period after a finish of said gearshift and said driver's pedalling for deceleration in excess of said predetermined time and then said compensating means compensate said predetermined pedalling speeds by a predetermined value Z so as to decrease said tendency of said downshift of said automatic transmission.

6. A device for controlling operations of an automatic transmission as claimed in claim 5, wherein the relationship between said predetermined values X, Y and Z is that X is more than Y and that Y is more than Z.

7. A device for controlling operations of an automatic transmission as claimed in claim 1, wherein said monitoring means detect at least one of said driver's pedalling for acceleration at a speed more than said predetermined pedalling speed in a predetermined time period from a after a finish of said gearshift and said driver's pedalling for acceleration prior to a predetermined time and wherein said monitoring means detect said driver's pedalling for acceleration is maintained in a time period more than a predetermined second time period and then said compensating means compensate said predetermined pedalling speeds by a predetermined value $\alpha$ so as to increase a tendency of a downshift of said automatic transmission.

8. A device for controlling operations of an automatic transmission as claimed in claim 1, wherein said monitoring means detect at least one of said driver's pedalling for acceleration at a speed more than said predetermined pedalling speed in a predetermined time first period from a after a finish of said gearshift and said driver's pedalling for acceleration prior to a predetermined time and wherein said monitoring means detect said driver's pedalling for acceleration being canceled within a predetermined second period and then said compensating means compensate said pedalling speeds by a predetermined value $\beta$ so as to increase a tendency of a downshift of said automatic transmission.

9. A device for controlling operations of an automatic transmission as claimed in claim 8, wherein said monitoring means detect at least one of said driver's pedalling for acceleration at a speed less than said predetermined pedalling speed-in a predetermined time period from a after a finish of said gearshift and said driver's pedalling for acceleration in excess of a predetermined time and then said compensating means compensate said predetermined pedalling speeds by a predetermined value $\gamma$ so as to increase said tendency of said downshift of said automatic transmission.

10. A device for controlling operations of an automatic transmission as claimed in claim 7, wherein the relationship between said predetermined values $\alpha$, $\beta$ and $\gamma$ is that $\alpha$ is more than $\beta$ and that $\beta$ is more than $\gamma$.

11. A device for controlling operations of an automatic transmission as claimed in claim 3, wherein said monitoring means detect at least one of said driver's pedalling for deceleration at a speed more than said pedalling speed in a predetermined time period from a after a finish of said gearshift and said driver's pedalling for deceleration prior to a predetermined time and then said compensation means compensate said predetermined pedalling speeds by a predetermined value γ so as to decrease a tendency of a downshift of said automatic transmission.

12. A device for controlling operations of an automatic transmission as claimed in claim 7, wherein said monitoring means detect at least one of said driver's pedalling for acceleration at a speed more than said predetermined pedalling speed in a predetermined time first period from a after a finish of said gearshift and said driver's pedalling for acceleration prior to a predetermined time and wherein said monitoring means detect said driver's pedalling for acceleration being cancelled within a predetermined second period and then said compensating means compensate said predetermined pedalling speeds by a predetermined value β so as to increase a tendency of a downshift of said automatic transmission.

13. A device for controlling operations of an automatic transmission as claimed in claim 8, wherein the relationship between said predetermined values α, β and γ is that α is more than β and the β is more than γ.

14. A device for controlling operations of an automatic transmission as claimed in claim 9, wherein the relationship between said predetermined values α, β and γ is that α is more than β and the β is more than γ.

* * * * *